(12) United States Patent
Boger et al.

(10) Patent No.: US 9,677,166 B2
(45) Date of Patent: Jun. 13, 2017

(54) METHOD FOR PRODUCING PIECES HAVING A MODIFIED SURFACE

(75) Inventors: Snjezana Boger, Esslingen (DE); Peter Englert, Bad Friedrichshall (DE); Mathias Pfitzer, Aalen (DE); Ingo Trautwein, Bietigheim-Bissingen (DE); Sabine Sedlmeir, Mosbach (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 12/908,399

(22) Filed: Oct. 20, 2010

(65) Prior Publication Data

US 2011/0030852 A1 Feb. 10, 2011

Related U.S. Application Data

(62) Division of application No. 10/551,185, filed as application No. PCT/EP2004/002751 on Mar. 17, 2004, now Pat. No. 7,829,151.

(30) Foreign Application Priority Data

Mar. 31, 2003 (DE) .................................. 103 14 700

(51) Int. Cl.

| | |
|---|---|
| C23C 22/34 | (2006.01) |
| C23C 8/16 | (2006.01) |
| B23K 35/36 | (2006.01) |
| C23C 8/18 | (2006.01) |
| C23C 8/40 | (2006.01) |
| C23C 22/66 | (2006.01) |
| C23C 22/68 | (2006.01) |
| C23C 22/73 | (2006.01) |

(52) U.S. Cl.
CPC ............ *C23C 8/16* (2013.01); *B23K 35/3605* (2013.01); *C23C 8/18* (2013.01); *C23C 8/40* (2013.01); *C23C 22/34* (2013.01); *C23C 22/66* (2013.01); *C23C 22/68* (2013.01); *C23C 22/73* (2013.01)

(58) Field of Classification Search
CPC ..... B23K 35/3605; C23C 22/34; C23C 22/66; C23C 22/73; C23C 8/40
USPC ........................... 427/421.1; 148/400; 228/18
See application file for complete search history.

(56) References Cited

U.S. PATENT DOCUMENTS

| | | | |
|---|---|---|---|
| 2,809,423 A | 10/1957 | Hanink | |
| 3,945,899 A * | 3/1976 | Nikaido et al. ................. | 205/50 |
| 3,969,153 A | 7/1976 | Suzuki et al. | |
| 3,971,501 A | 7/1976 | Cooke | |
| 4,123,290 A | 10/1978 | Kennedy | |
| 4,446,057 A | 5/1984 | Lee et al. | |
| 4,643,241 A * | 2/1987 | Yonekura et al. ............ | 164/101 |
| 4,690,837 A | 9/1987 | Doroszkowski et al. | |
| 5,100,048 A | 3/1992 | Timsit | |
| 5,104,577 A * | 4/1992 | Ikeda et al. ..................... | 252/387 |
| 5,450,666 A * | 9/1995 | Conn et al. .............. | 29/890.043 |
| 5,496,417 A | 3/1996 | Farrugia et al. | |
| 5,532,024 A | 7/1996 | Arndt et al. | |
| 5,684,066 A | 11/1997 | Eklund et al. | |
| 5,750,197 A | 5/1998 | van Ooij et al. | |
| 5,762,132 A | 6/1998 | Evans et al. | |
| 5,785,770 A * | 7/1998 | Meshri et al. ................... | 148/26 |
| 5,820,015 A | 10/1998 | Childree | |
| 5,862,976 A * | 1/1999 | Yamamoto et al. .......... | 228/224 |
| 6,076,727 A | 6/2000 | Evans et al. | |
| 6,090,446 A | 7/2000 | Nakashima et al. | |
| 6,422,451 B2 * | 7/2002 | Bendall et al. ............... | 228/199 |
| 6,475,301 B1 * | 11/2002 | Grab et al. .................... | 148/272 |
| 6,610,422 B1 | 8/2003 | Ooi et al. | |
| 6,648,214 B1 | 11/2003 | Sucke | |
| 6,881,491 B2 | 4/2005 | Jankosky et al. | |
| 7,407,711 B2 * | 8/2008 | Phelps et al. ................. | 428/469 |
| 7,829,151 B2 | 11/2010 | Boger et al. | |
| 2003/0039850 A1 | 2/2003 | Inbe et al. | |
| 2004/0229071 A1 | 11/2004 | Jankosky et al. | |
| 2005/0282003 A1 * | 12/2005 | Mayzel et al. ................ | 428/336 |

FOREIGN PATENT DOCUMENTS

| | | |
|---|---|---|
| AT | 255857 | 7/1967 |
| BR | 9807057 A | 5/2000 |
| CH | 295 082 A | 12/1953 |
| CN | 1045817 | 10/1990 |
| CN | 1061806 | 6/1992 |
| CN | 1109515 | 10/1995 |
| CN | 1181029 | 5/1998 |
| CN | 1449876 A | 10/2003 |
| DE | 1191200 | 4/1965 |
| DE | 1 771 936 A1 | 1/1972 |
| DE | 26 14 872 | 10/1976 |
| DE | 29 09 698 A1 | 9/1979 |
| DE | 37 44 032 | 7/1988 |
| DE | 690 12 941 T2 | 3/1995 |

(Continued)

OTHER PUBLICATIONS

S. Boger, U.S. PTO Office Action, U.S. Appl. No. 11/576,918, dated Feb. 3, 2010, 25 pages.
S. Boger, U.S. PTO Office Action, U.S. Appl. No. 11/576,918, dated Aug. 14, 2009, 24 pages.
Von G. Stolzenfels et al., "Industrial Coating Operation", No. 3, pp. 93-98.
Riese-Meyer et al., Aluminium 1991, No. 12, pp. 1215-1221.
Eric B. Ratts et al., "Thermal modeling of controlled atmosphere brazing process using virtual reality technology", 2000, Pergamon, pp. 1667-1678.
Office Action dated Apr. 13, 2012 in related Brazilian application No. PI0408868-9 (3 pgs.).
Office Action mailed Aug. 18, 2011 in related U.S. Appl. No. 11/576,918 (27 pgs.).
Office Action mailed May 14, 2012 in related U.S. Appl. No. 11/576,918 (23 pgs.).

(Continued)

*Primary Examiner* — Alexander Weddle
(74) *Attorney, Agent, or Firm* — Muncy, Geissler, Olds & Lowe, P.C.

(57) ABSTRACT

The invention relates to a method for modifying piece surfaces consisting in bringing pieces into contact with at least one type of a modifying agent in such a way that the modification of the surface is carried out.

18 Claims, No Drawings

(56) References Cited

FOREIGN PATENT DOCUMENTS

| | | |
|---|---:|---|
| DE | 4 429 975 C1 | 12/1995 |
| DE | 692 05 153 | 2/1996 |
| DE | 195 15 909 A1 | 10/1996 |
| DE | 195 48 740 A1 | 6/1997 |
| DE | 197 13 237 A1 | 11/1997 |
| DE | 198 59 735 A1 | 7/2000 |
| DE | 695 15 289 | 11/2000 |
| DE | 100 44 454 A1 | 7/2001 |
| DE | 101 41 883 A1 | 3/2003 |
| DE | 201 21 992 | 10/2003 |
| DE | 103 14 700 | 10/2004 |
| EP | 0 163 471 A2 | 12/1985 |
| EP | 0 396 238 | 11/1990 |
| EP | 0 488 497 | 6/1992 |
| EP | 0 568 568 | 11/1993 |
| EP | 0655 517 A1 | 5/1995 |
| EP | 0 781 860 A1 | 7/1997 |
| EP | 0 970 757 | 1/2000 |
| EP | 1 127 653 | 8/2001 |
| EP | 1 142 663 A1 | 10/2001 |
| EP | 1 154 042 A1 | 11/2001 |
| EP | 1154041 A1 * | 11/2001 |
| EP | 2 236 974 | 10/2010 |
| GB | 863098 | 3/1961 |
| GB | 863098 A * | 3/1961 |
| GB | 1076678 | 7/1967 |
| GB | 2 016 529 | 9/1979 |
| JP | 54-031042 A | 3/1979 |
| JP | 56-055573 A | 5/1981 |
| JP | 59-028575 A | 2/1984 |
| JP | 60-083771 A | 5/1985 |
| JP | 63-317297 A | 12/1988 |
| JP | 10-088367 A | 4/1998 |
| JP | 2002-146549 A | 5/2002 |
| JP | 2002-332581 A | 11/2002 |
| JP | 2003-003276 A | 1/2003 |
| KR | 950 006 282 B1 | 6/1995 |
| WO | WO 94/01593 | 1/1994 |
| WO | WO 99/48641 A1 | 9/1999 |
| WO | WO 9967029 A1 * | 12/1999 |
| WO | WO 03/048403 A1 | 6/2003 |
| WO | WO 2004/087993 | 10/2004 |

OTHER PUBLICATIONS

Office Action mailed Jan. 3, 2013 in related European Application No. 10 172 067.0 (5 pgs.).

Office Action mailed May 15, 2012 in related European application No. 10 172 067.0 (6 pgs.).

* cited by examiner

METHOD FOR PRODUCING PIECES HAVING A MODIFIED SURFACE

CROSS-REFERENCE TO RELATED APPLICATIONS

The present application is a Divisional of U.S. application Ser. No. 10/551,185, filed Sep. 29, 2005, which is a National Stage Application of PCT No. PCT/EP2004/002751 filed Mar. 17, 2004, and claims the benefit of priority from prior Federal Republic of Germany Patent Application No. 103 14 700.4, filed Mar. 31, 2003, the entire contents of each of these applications are incorporated herein by reference.

BACKGROUND

The present invention relates to processes for producing surface-modified workpieces made from metal and/or one or more alloys, to the workpieces produced by means of these processes and to processes for joining at least two such workpieces.

The direct coating of aluminum or aluminum alloys by means of organic coating systems is virtually impossible on account of the inadequate bonding of the organic coating systems to the aluminum. Therefore, to improve the bonding between the starting material and organic coating systems, it is known to subject aluminum or aluminum alloys to what is known as a boehmite treatment, in which hot water or hot steam, if appropriate together with ammonia or amines, is brought into contact with the workpiece, so as to form or thicken an aluminum oxide or boehmite layer. This then allows an organic coating to be applied. EP 1 142 663 A1 describes boehmite processes, in which deionized water at temperatures of approximately 100° C. or steam at temperatures of 150° C. is used to surface-modify aluminum parts. U.S. Pat. No. 3,945,899 has disclosed a boehmite treatment of aluminum parts with water at a temperature of from 65 to 100° C. or steam at temperatures of 100 to 180° C., with the addition of amines and ammonia further boosting the aluminum oxide layer.

It is also known from this document to subject aluminum or its alloys to a chemical surface treatment using aqueous solutions of chromates or phosphates, in order in this way firstly to increase the bonding and secondly to reduce the susceptibility to corrosion. This conversion treatment, as it is known, is also known from Stolzenfels (Industrie-Lackierbetrieb, [Industrial coating operation] No. 3, pp. 93-98, Curt R. Vincentz Verlag), which describes chromating treatments of aluminum workpieces at temperatures of from 20 to 50° C. Riese-Meyer et al. (Aluminium 1991, No. 12, pages 1215-1221) describes chemical conversion treatments by means of layer-forming phosphating steps and chromating steps, allowing the coating bonding and corrosion resistance of aluminum workpieces to be improved. According to this document too, the chromating is carried out at a temperature of from 20 to 30° C. or 30 to 40° C.

SUMMARY OF THE PREFERRED EMBODIMENTS

However, the abovementioned processes have proven disadvantageous inter alia on account of energy considerations. Since the workpieces which are to be modified in accordance with the prior art are generally at room temperature, i.e. are used in a cooled state with respect to a preceding brazing or joining process, considerable handling and time are required for the surface modification of such workpieces. Moreover, the shaped bodies made from aluminum or aluminum alloys which are to be modified in the prior art tend toward what is known as coarse-grain formation, on account of the slow cooling process carried out after they have been produced.

Therefore, the present invention is based on the technical problem of providing processes which overcome the abovementioned drawbacks, in particular of providing processes which provide workpieces made from aluminum or aluminum alloys with improved bonding and/or corrosion resistance at lower cost, in particular workpieces whose structure is distinguished by reduced coarse-grain formation compared to conventionally produced aluminum or aluminum alloy workpieces while having a corrosion resistance and bonding which are as good if not better.

The present invention solves the technical problem on which it is based by providing a process for producing surface-modified workpieces made from aluminum or one or more aluminum alloys, comprising the steps of providing the workpiece which is to be modified and is at a temperature of from 40 to 700° C., preferably 80 to 550°, in particular 300 to 550° C., and then treating this workpiece at the abovementioned temperature with at least on modifying agent to obtain the surface-modified workpiece, the at least one modifying agent being at a temperature of from −200° C. to 100° C., preferably at most 80° C. and in particular at least 0° C., preferably 20 to 65° C. Therefore, the invention solves the problem on which it is based in particular by providing, at a relatively high temperature, a workpiece whose surface is to be modified and bringing it into contact with at least one modifying agent which is at a lower temperature, so as produce a surface-modified workpiece.

DETAILED DESCRIPTION OF THE PREFERRED EMBODIMENTS

In the context of the present invention, a workpiece is to be understood as meaning an object of any desired form which, by way of example, may be in the form of a shaped body, i.e. a body of defined form, or alternatively also in the form of granules or a powder.

In a preferred embodiment, the workpiece is in the form of a heat exchanger or a significant component thereof.

In a preferred embodiment of the present invention, the workpiece which is to be modified is composed of aluminum, magnesium, copper or one or more aluminum and/or magnesium and/or copper alloys, i.e. it consists of aluminum or one or more alloys or it substantially comprises aluminum or one or more aluminum alloys, for example, in amounts of at least 50, 60, 70, 80, 90, 95 and in particular 99% by weight, based on the weight of the workpiece.

In its first configuration, the invention provides for the workpiece whose surface is to be modified to be provided in heated form, the workpiece to be modified being at a temperature of from 40 to 700° C., in particular 100 to 550° C., preferably 150 to 550° and particularly preferably 300 to 550° C. In a preferred embodiment, this can be achieved by virtue of the fact that the workpiece is used according to the invention when it is still hot immediately following its production process, e.g. after it emerges from a brazing zone, after thermal joining processes or after heating in chamber furnaces, so as to exploit the heat capacity which is present in these workpieces. The workpiece which is at one of the abovementioned temperatures, for example a temperature of from 80 to 550, in particular 300 to 550° C., is consequently treated by utilizing its existing elevated temperature, i.e. by being brought into contact with at least one surface-modifying agent, in such a way as to achieve the desired surface modification of the workpiece.

The surface modification which is desired in accordance with the invention is in this case a chemical conversion, i.e. the formation of a conversion layer and/or the formation or thickening of a boehmite layer or aluminum oxide layer. In a preferred embodiment, the surface modification which is desired in accordance with the invention may also comprise the incorporation of corrosion-inhibiting substances into the aluminum oxide or boehmite layer and/or the production of conversion layers by chemical-physical modification of possibly existing flux layers.

For example, it is possible to provide for workpieces which already include a CAB flux layer on account of a preceding CAB brazing process to be treated by means of the procedure according to the invention in such a way that the existing CAB flux layer is chemically-physically modified. The procedure according to the invention may result in the existing flux layer being doped, for example with metals from main groups I, II, III or IV or from the transition groups, in particular IV to VI, and/or having its oxygen content increased. The treatment according to the invention results, inter alia, in an improved resistance to corrosion.

The use of a modifying agent at a low temperature, in particular a temperature from −200° C. to 100° C., preferably 0 to 80° C., particularly preferably 20 to 65° C., which is preferred in accordance with the invention leads, when treating a workpiece at a high temperature of from 80 to 700° C., in particular 300 to 550° C., to rapid cooling of the workpiece and therefore advantageously to prevention or reduction of the coarse-grain formation in the workpiece. Consequently, the resulting workpieces under certain circumstances advantageously differ in terms of their structure from conventionally produced workpieces.

The treatment of flux (CAB)-coated workpieces which is preferably provided in accordance with the invention under certain circumstances leads to an advantageous continuous and rounded appearance of the flux layer of the aluminum part, which differs from the open-pore, sharp-edged and platelet-like appearance of untreated flux-coated aluminum parts.

In a further configuration of the present invention, the present technical problem is solved by providing a process for producing surface-modified workpieces made from a metal and/or one or more alloys, comprising the steps of providing the workpiece that is to be modified and treating this workpiece with at least one modifying agent to obtain a surface-modified workpiece, the at least one modifying agent being at a temperature of from 80 to 550° C., preferably 100 to 200° C., preferably 150 to 200° C.

In this configuration of the invention, the workpiece which is to be modified may be at a temperature of from 15 to 80° C., in particular 40 to 65° C., but also 20 to 60° C., in particular 20 to 40° C., preferably 20 to 30° C., or from 80 to 700° C., preferably 100 to 700° C., preferably 150 to 700° C., in particular 300 to 550° C. This configuration of the present invention also allows the advantageous surface-modification of a workpiece, in particular the production of a metal oxide or boehmite layer, the thickening of an existing metal oxide or boehmite layer, the incorporation of corrosion-inhibiting substances into a metal oxide or boehmite layer and/or the production of conversion layers by chemical-physical modification, in particular of flux layers.

Following the surface modification of the workpiece, the workpieces can be treated further in the usual way, in particular by being rinsed and dried. Of course, it is also possible to carry out a further coating operation, for example by means of organic coating systems. The present process therefore provides part of the production process of a workpiece, for example a heat exchanger. The procedure which is provided for in accordance with the invention, within this production process, leads to a reduction in the production costs for workpieces, to a saving on energy and resources, in particular by utilizing existing heat capacities of the workpieces, and to the reduced use or the avoidance of the use of aggressive chemicals for the surface treatment.

Under certain circumstances, all known chemical elements, compounds, mixtures or other compositions may be suitable for use as the modifying agent. A modifying agent which is preferably used is one or more compounds, in particular one or more metal salts of one or more elements from the transition groups of the PSE, in particular transition groups IV to VI of the PSE (periodic system of the elements), for example titanium, hafnium, vanadium, tantalum, molybdenum, tungsten and in particular zirconium.

In a further embodiment of the present invention, the modifying agent may be one or more compounds, in particular one or more metal salts of one or more elements from main groups I, II, III, and/or IV of the periodic system of the elements, for example a metal salt of beryllium, barium, in particular of magnesium or calcium or sodium or potassium.

In a further embodiment of the present invention, the modifying agent may be one or more compounds of one or more elements from main groups V, VI, VII and/or VIII of the periodic system of the elements.

In a preferred embodiment of the invention, the above-mentioned metals may be in salt form with anions selected from the group consisting of chlorides, carbonates, in particular hydrogen carbonates, nitrates, sulfates, peroxides and phosphates. In particular the metal salts of elements from main groups I and II, for example potassium, sodium and calcium, may be in the form of a hydroxide solution, i.e. KOH, NaOH or $Ca(OH)_2$, or in the form of a borate, aluminate, silicate or halide, in particular fluoride.

In a further preferred embodiment of the invention, the at least one modifying agent is a CAB-flux ("controlled atmosphere brazing") of the general formula $K_xAlF_y$, where x equals 1 to 3 and y=4 to 6, for example potassium aluminum hexafluoride and/or $Cs_xAlF_y$.

In a further preferred embodiment, the modifying agent used is an ammonium salt, such as for example ammonium fluoride or ammonium carbonate, potassium fluoride, sodium or potassium silicate, sodium or potassium borate, sodium or potassium aluminate, crosslinkable, in particular organometal, such as for example organozirconium or organotitanium, or organosilicon compounds, or alternatively hydrogen peroxide.

In a particularly preferred embodiment, the CAB flux, ammonium salt and/or potassium fluoride are used in alkaline phase, in particular in the form of aqueous, preferably alkaline solutions or alkaline vapors or aerosols, to treat the workpiece.

The metal compounds of one of the elements of the transition groups, in particular transition groups IV to VI, or main groups I, II, III or IV, may be in organic and/or inorganic phase, preferably in aqueous phase, in particular in liquid or gaseous phase, preferably in aerosol form or as a vapor. The water which is used for the dissolution is preferably deionized water.

In a further preferred embodiment, there is provision for water, preferably deionized and distilled water, to be used as modifying agent for treating the surface of the workpiece. Of course, according to the invention it is also possible for the surface-modifying agent used to be aqueous solutions of ammonia, of amines, in particular primary, secondary or tertiary amines, for example mono-, di- or triethanolamines, dimethylethanolamines, organic acids or salts of ammonia, amines, halogenated organic compounds and/or organic acids. Of course, it is also possible to use mixtures of the abovementioned modifying agents.

It is preferable to use a solution of 0.1-1% of KOH and/or 0.1-1% of NH$_4$OH and/or 0.1-1% of K$_x$AlF$_y$ (x=1 to 3, y=4 to 6) and/or 0.1-1% of Ca(NO$_3$)$_2$ and/or 0.1-1% of salts of the elements of transition groups IV to VI of the PSE in deionized water.

In a particularly preferred embodiment of the present invention, the starting workpiece used for the process according to the invention is a CAB flux-coated workpiece which results from a CAB brazing process and is treated, under the conditions mentioned above, with one or more of the modifying agents used. In particular if the surface is treated with water or aqueous solutions, it is possible to obtain a modified surface with an increased oxygen content; depending on the type of modifying agent used, this surface may also be doped, for example with one or more of the metals from main group I, II, III or IV or from the transition groups, in particular transition groups IV to VI, or other modifying agents used.

In another preferred embodiment, the invention provides for the metal salt, the CAB flux, ammonium salt and/or potassium fluoride or another constituent of the modifying agent to be used in a matrix, for example a matrix of organic and/or inorganic solvents or mixtures thereof, to treat the surface of the workpiece. In this case, the matrix contains organometal, in particular organosilicon compounds. In particular, the matrix contains organic and/or inorganic polymers, or alternatively a mixture of the abovementioned substances.

In a particularly preferred embodiment, there is provision for the metal salt, the CAB flux, ammonium fluoride and/or potassium fluoride or another constituent of the modifying agent to be used in a concentration of from 10 ppm to 100000 ppm, preferably from 50 ppm to 10 000 ppm in the treatment.

The at least one modifying agent is preferably brought into contact with the workpiece that is to be modified by the workpiece being immersed in the at least one agent and impregnated with the agent or by it being rinsed or flooded with the at least one modifying agent and thus impregnated with it, or by the at least one modifying agent being sprayed onto the workpiece, in particular by means of what is known as airless or ultrasound atomization, or being brought into contact with it is some other form.

In a particular embodiment, it is possible to provide for the modifying agent to act on the workpiece at a pressure which is higher than atmospheric pressure. In the case of spraying, in addition to compressed air it is also possible to use other gases, for example oxygen, nitrogen, fluorine, ozone or steam.

Examples of metal salts used include aqueous solutions of Ca(NO$_3$)$_2$ or Zr(NO$_3$)$_4$, in particular in concentrations of between 0.1% and 5%, the pH of which is preferably between 5.5 and 7.5 to 8. The temperature of use is in this case advantageously between 40° C. and 60° C. Under certain circumstances, it may also be advantageous to add from 0.005% to 5% of tetraethylammonium tetrafluoroborate.

A solution of this type is used in particular to treat a brazed, preferably CAB-brazed, heat exchanger.

According to an advantageous embodiment, the at least one modifying agent includes a biocidal agent. By way of example, it is desirable for a heat exchanger used in a heating and/or air-conditioning installation to have a germ-inhibiting action which is produced as a result.

According to a further advantageous embodiment, the modifying agent produces an oxidation-inhibiting action by virtue of the agent including an oxidation inhibitor or producing an oxidation inhibitor on the surface by means of the process according to the invention. An oxidation inhibitor is provided, for example, by a metal oxide or boehmite layer.

Of course, the invention also relates to surface-modified workpieces produced by means of the abovementioned processes, in particular surface-modified heat exchangers made from aluminum or aluminum alloys.

In an advantageous refinement of the invention, in a further step the surface-modified workpiece is provided with one or more organic or inorganic coating systems which particularly advantageously has germ-inhibiting and/or hydrophilic or hydrophobic properties. It is possible for these coating layers to be applied with or without an intervening drying step.

The invention is also implemented by a process for joining two or more workpieces. A production process which includes a process of this type can be carried out quickly, so that it is possible to reduce the manufacturing costs. This applies in particular to processes for cohesively joining a plurality of workpieces, but is also achieved in other joining processes, such as for example mechanical joining, in which case under certain circumstances it may be necessary to (re)heat the workpiece in order to apply the process according to the invention.

The invention is also achieved by an apparatus for cohesively joining at least two workpieces, in which a temperature-control chamber for controlling the temperature of, in particular heating, the workpieces, has a device for applying a surface-modifying agent to at least one of the workpieces. The temperature-control chamber advantageously serves simultaneously for cohesive bonding, such as for example brazing or soldering or welding, and surface-modifying the workpieces.

The device for applying a surface-modifying agent is preferably designed as a spray nozzle, the temperature of which can itself particularly preferably be controlled in order for the process according to the invention to be carried out. It is equally possible for the temperature of the surface-modifying agent to be controlled in a feedline of the device.

Otherwise, the apparatus according to the invention may under certain circumstances be constructed in a known way, for example as a vacuum or continuous brazing furnace.

Further advantageous configurations of the present invention will emerge from the subclaims.

The invention claimed is:

1. A surface-modified workpiece, made from at least one of a metal and one or more alloys, produced by a process comprising the steps of:
   providing, at a temperature of 100 to 700° C., a workpiece which is to be modified, the workpiece having an existing controlled atmosphere brazing (CAB) flux layer, and
   treating the workpiece having the temperature of 100 to 700° C. with at least one modifying agent to chemically and physically modify the existing controlled atmosphere brazing (CAB) flux layer in order to obtain the surface-modified workpiece,
   wherein the at least one modifying agent comprises at least one of (i) a metal salt of an element from one of transition groups I to VI of the periodic table of elements and a compound of an element from groups V, VI, VII or VIII of the periodic table of elements, and (ii) a controlled atmosphere brazing (CAB) flux, and wherein the at least one modifying agent has a temperature of at least −200° C. and at most 80° C. at time of the treating, wherein the chemically and physically modifying the existing controlled atmosphere brazing (CAB) flux layer results in the existing controlled atmosphere brazing (CAB) flux layer being impregnated with the modifying agent, and wherein the chemically and physically modifying the existing controlled atmosphere brazing (CAB) flux layer results in the existing controlled atmosphere brazing (CAB) flux layer having a continuous and rounded surface.

2. The workpiece as claimed in claim 1, wherein at least one subsequent treatment step is provided with an organic or inorganic coating system.

3. The workpiece as claimed in claim 2, wherein the coating system includes a biocidal agent, has hydrophilic properties, or has hydrophobic properties.

4. The workpiece as claimed in claim 1, wherein the workpiece to be modified is provided at a temperature of 300 to 550° C.

5. The workpiece as claimed in claim 1, wherein the at least one modifying agent has a temperature of at least 0° C. to at most 80° C. at the time of the treating.

6. The workpiece as claimed in claim 5, wherein the at least one modifying agent has a temperature of at most 65° C. at the time of the treating.

7. The workpiece as claimed in claim 1, wherein the at least one modifying agent comprises the metal salt of an element from one of transition groups I to VI of the periodic table of elements and the compound of an element from groups V, VI, VII or VIII of the periodic table of elements.

8. The workpiece as claimed in claim 7, wherein the metal salt is in an aqueous phase, the pH of which is between 3 and 10.

9. The workpiece as claimed in claim 1, wherein the controlled atmosphere brazing (CAB) flux comprising the at least one modifying agent has a general formula of $K_xAlF_y$, $Cs_xAlF_y$, or a combination thereof, where x=1-3 and y=4-6.

10. The workpiece as claimed in claim 1, wherein the treating step comprises contacting the workpiece to be modified with at least one modifying agent in aerosol form, vapor form, or a combination thereof.

11. The workpiece as claimed in claim 1, wherein the at least one of the metal and one or more alloys is at least one of aluminum, magnesium, copper, an aluminum-based alloy, a magnesium-based alloy, and a copper-based alloy.

12. The workpiece as claimed in claim 1, wherein the workpiece to be modified is a heat exchanger.

13. The workpiece as claimed in claim 1, wherein the at least one modifying agent comprises the metal salt of an element from one of transition groups I to VI of the periodic table of elements, the compound of an element from groups V, VI, VII or VIII of the periodic table of elements, and the controlled atmosphere brazing (CAB) flux.

14. The workpiece as claimed in claim 1, wherein chemically and physically modifying the existing controlled atmosphere brazing (CAB) flux produces at least one conversion layer.

15. The workpiece as claimed in claim 1, wherein chemically and physically modifying the existing controlled atmosphere brazing (CAB) flux results in the existing controlled atmosphere brazing (CAB) flux being doped with a metal from one of the main groups I-IV and the transition groups of the periodic table of elements.

16. The workpiece as claimed in claim 1, wherein chemically and physically modifying the existing controlled atmosphere brazing (CAB) flux results in an oxygen content of the existing controlled atmosphere brazing (CAB) flux being increased.

17. The workpiece as claimed in claim 1, wherein the process for producing the workpiece further comprises heating the workpiece prior to treating the workpiece with the at least one modifying agent.

18. The workpiece as claimed in claim 1, wherein the workpiece to be modified is provided at a temperature of 300 to 550° C., wherein the at least one modifying agent has a temperature of at least 0° C. to at most 80° C. at the time of the treating, wherein the metal salt is in an aqueous phase, the pH of which is between 3 and 10, wherein the at least one modifying agent is in aerosol and/or vapor form, and wherein the at least one of the metal and one or more alloys is at least one of aluminum, magnesium, copper, an aluminum-based alloy, a magnesium-based alloy, and a copper-based alloy.

* * * * *